United States Patent
Airoldi

(10) Patent No.: US 10,605,234 B2
(45) Date of Patent: Mar. 31, 2020

(54) WIND TURBINE WITH A NACELLE INCLUDING A WATER DRAINING DEVICE

(71) Applicant: Siemens Gamesa Renewable Energy, Brande (DE)

(72) Inventor: Giovanni Airoldi, GG Eindhoven (NL)

(73) Assignee: SIEMENS GAMESA RENEWABLE ENERGY A/S (DK)

(*) Notice: Subject to any disclaimer, the term of this patent is extended or adjusted under 35 U.S.C. 154(b) by 0 days.

(21) Appl. No.: 16/166,390

(22) Filed: Oct. 22, 2018

(65) Prior Publication Data

US 2019/0120211 A1    Apr. 25, 2019

(30) Foreign Application Priority Data

Oct. 24, 2017 (EP) ..................... 17198324

(51) Int. Cl.
| | |
|---|---|
| *F03D 80/80* | (2016.01) |
| *F03D 9/25* | (2016.01) |
| *F03D 80/60* | (2016.01) |
| *H02K 7/18* | (2006.01) |

(52) U.S. Cl.
CPC ............ *F03D 80/80* (2016.05); *F03D 9/25* (2016.05); *F03D 80/60* (2016.05); *F05B 2240/14* (2013.01); *F05B 2260/20* (2013.01); *F05B 2260/602* (2013.01); *F05B 2260/64* (2013.01); *H02K 7/1838* (2013.01)

(58) Field of Classification Search
CPC ............ F03D 80/80; F03D 9/25; F03D 80/60
USPC ..................................................... 290/44, 55
See application file for complete search history.

(56) References Cited

U.S. PATENT DOCUMENTS

| | | | |
|---|---|---|---|
| 8,262,347 B2 * | 9/2012 | Wallace | F16N 31/004 290/55 |
| 9,103,320 B1 | 8/2015 | Potts et al. | |
| 2006/0137214 A1 * | 6/2006 | Achenbach | H05K 5/0213 34/468 |
| 2007/0119185 A1 * | 5/2007 | Pfannenberg | B01D 5/0042 62/3.2 |

(Continued)

FOREIGN PATENT DOCUMENTS

| | | |
|---|---|---|
| CN | 102619784 A | 8/2012 |
| CN | 103184982 B | 5/2015 |

(Continued)

OTHER PUBLICATIONS

European Search Report for Application No. 17198324.0, filed Oct. 25, 2017, dated Apr. 25, 2018.

(Continued)

*Primary Examiner* — Viet P Nguyen
(74) *Attorney, Agent, or Firm* — Schmeiser, Olsen & Watts LLP

(57) ABSTRACT

A wind turbine with nacelle includes an electrical generator, a cooling circuit including at least two cooling fans for channeling a fluid cooling medium from the electrical generator to an outer wall of the nacelle and a draining device for channeling drainage water from the cooling fans to an outer wall of the nacelle. The draining device includes at least a first draining portion connecting the cooling fans to an inside of the nacelle and at least a second draining portion for receiving drainage water from the first respective draining pipe and channeling the drainage water to the outer wall of the nacelle.

8 Claims, 2 Drawing Sheets

(56) References Cited

U.S. PATENT DOCUMENTS

| | | | |
|---|---|---|---|
| 2009/0060748 A1* | 3/2009 | Landa | F03D 80/60 416/93 R |
| 2009/0289461 A1* | 11/2009 | Larsen | F03D 7/02 290/55 |
| 2010/0127502 A1* | 5/2010 | Uchino | F03D 80/60 290/55 |
| 2010/0140952 A1* | 6/2010 | Jansen | H02K 9/14 290/55 |
| 2011/0163545 A1* | 7/2011 | Hirai | B01D 46/0086 290/44 |
| 2011/0221204 A1* | 9/2011 | Kim | F03D 1/00 290/55 |
| 2012/0235419 A1* | 9/2012 | Huang | F03D 80/80 290/55 |
| 2013/0056989 A1* | 3/2013 | Sabhapathy | F03D 80/60 290/55 |
| 2014/0346781 A1* | 11/2014 | Airoldi | H02K 7/1838 290/1 B |
| 2015/0001847 A1 | 1/2015 | Oba et al. | |
| 2015/0091307 A1* | 4/2015 | Funabashi | F03D 1/00 290/55 |
| 2015/0372565 A1* | 12/2015 | Airoldi | H02K 9/04 290/55 |
| 2015/0372566 A1* | 12/2015 | Airoldi | H02K 9/04 290/55 |
| 2018/0274522 A1* | 9/2018 | Airoldi | F03D 80/60 |
| 2019/0277263 A1* | 9/2019 | Airoldi | F03D 80/60 |

FOREIGN PATENT DOCUMENTS

| | | |
|---|---|---|
| DE | 102005025944 A1 | 12/2006 |
| EP | 2034181 A2 | 3/2009 |
| JP | 2013172535 A | 9/2013 |
| WO | 2008092449 A2 | 8/2008 |

OTHER PUBLICATIONS

Non-English Chinese Office Action for Application No. 201811251449.X, dated Jan. 3, 2020.

* cited by examiner

WIND TURBINE WITH A NACELLE INCLUDING A WATER DRAINING DEVICE

CROSS-REFERENCE TO RELATED APPLICATIONS

This application claims priority to EP Application No. 17198324.0, having a filing date of Oct. 25, 2017, the entire contents of which are hereby incorporated by reference.

FIELD OF TECHNOLOGY

The following relates to wind turbine with a nacelle including a water draining device and an electrical generator driven by the blades of the wind turbine. The wind turbine also includes a cooling circuit for cooling the generator.

BACKGROUND

In the above described technical field, the generator may be air cooled with the air being drawn out of the generator by two fans.

A reason for having two cooling fans is redundancy, i.e. in case of one cooling fan failing the other can still run and provide the cooling power required by the generator. In most operational conditions with low ambient temperature, one cooling fan alone is able to supply the cooling capacity necessary for full power production.

One inconvenient of the above describe layout is due to the short outlet ducting of the fans, which is necessarily determined by the limited space available in the nacelle. This causes, especially during storms and high cross wind periods, rainwater to enter the fans and consequently the generator. Water entering the generator should be prevented to avoid corrosion and the consequent damages, in which the generator would incur.

It is therefore desirable to provide in the nacelle a draining pipe between each of the fans and the external environment, to ensure a complete drainage of any water entering the fan and prevent the ingress of rainwater into the generator.

At the same it is however further desirable that such draining pipe does not allow dirty air from the external environment to reach the fans and the generator. The external environment may for example include dusts or other pollutants potentially dangerous for the fans and electrical generator.

Scope of the present is to provide a nacelle satisfying the above positive requirements, i.e. the draining of water from the cooling fans in the nacelle, and at the same time avoiding the described inconveniences, i.e. avoiding the entering of dirty air in the nacelle through the water draining system.

SUMMARY

According to embodiments of the invention there is provided a wind turbine with a nacelle comprising:
an electrical generator,
a cooling circuit including at least two cooling fans for channeling a fluid cooling medium from the electrical generator to an outer wall of the nacelle,
a draining device for channeling drainage water from the cooling fans to an outer wall of the nacelle,
wherein the draining device comprises at least a first draining portion connecting the respective cooling fan to an inside of the nacelle and at least a second draining portion for receiving drainage water from the first respective draining pipe and channeling the drainage water to the outer wall of the nacelle.

The first draining portion of the draining device ensures that only the clean cooling medium inside the nacelle can eventually reach the fans and the electrical generator, thus preventing corrosion.

The second first draining portion of the draining device ensures that drainage water is channeled towards an outside of the nacelle. Therefore the draining device of the present achieves the above defined scope.

In embodiments of the present invention, the draining device comprises at least a water collector interposed between the first draining portion and the second draining portion.

Advantageously, the water collector collects water from the first draining portion, preventing spillages of water in the inside of the nacelle.

In other embodiments of the present invention, the first draining portion comprises for each cooling fans a first respective draining pipe connecting the respective cooling fan to an inside of the nacelle and the second draining portion comprises a second respective draining pipe for receiving drainage water from the first respective draining pipe and channeling the drainage water to the outer wall of the nacelle. The water collector may be directly provided between the first respective draining pipe and the second draining pipe.

In further embodiments of the present invention, the cooling circuit comprises at least an inlet fan for channeling the fluid cooling medium from an outside of the nacelle to an inside of the nacelle. The inlet fan and the cooling fans may be operated in order to provide a positive differential pressure in the inside and of the nacelle with respect to the outside of the nacelle. Advantageously, this allows protecting the inside of the nacelle from the entering of dirty air from the external environment, which may include dusts or other pollutants potentially dangerous for the fans and electrical generator.

The aspects defined above and further aspects of embodiments of the present invention are apparent from the examples of embodiment to be described hereinafter and are explained with reference to the examples of embodiment. The embodiments will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
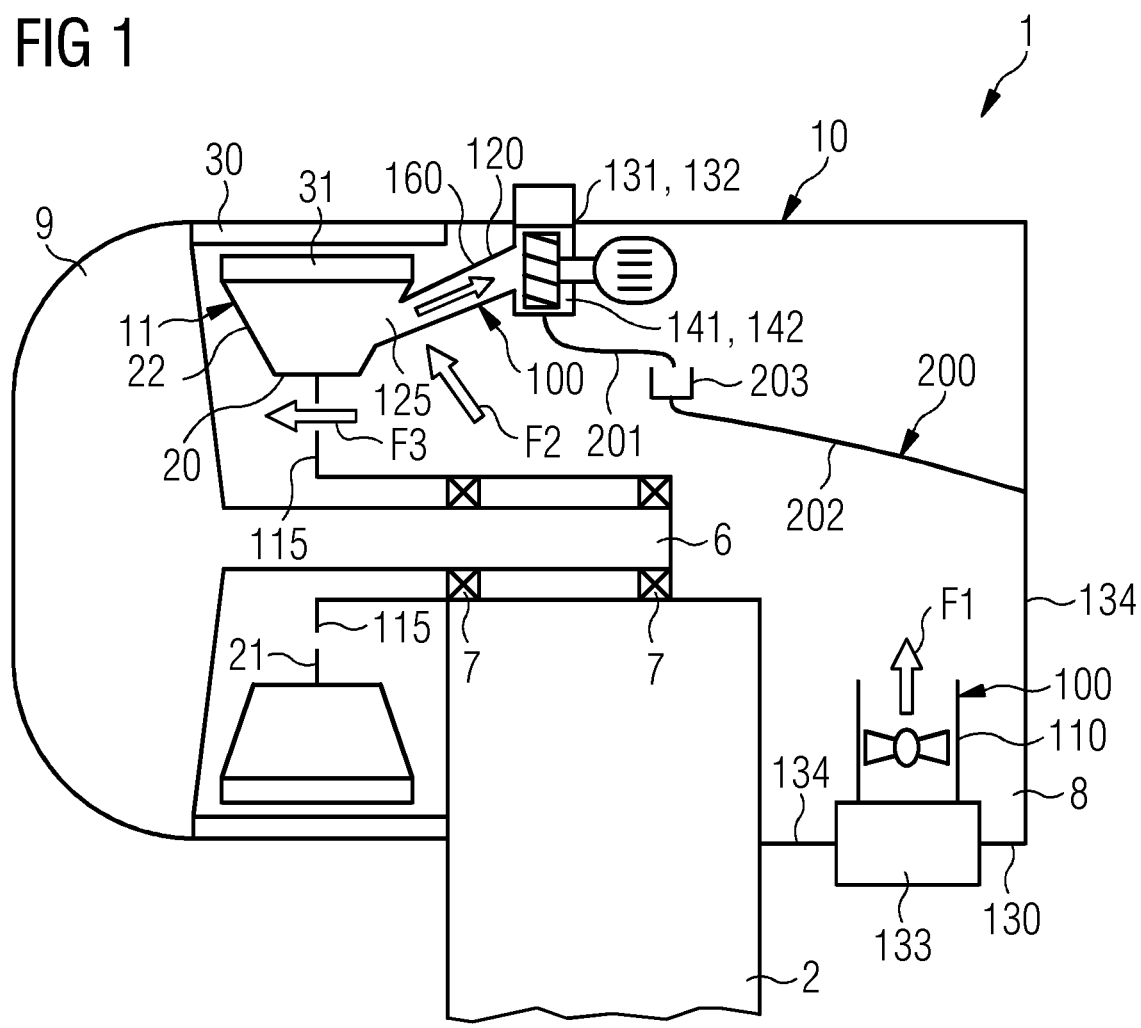
FIG. 1 shows a schematic lateral section of an upper part of a wind turbine including a nacelle.

The illustrations in the drawings are schematic. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a wind turbine 1 having a nacelle 10 according to embodiments of the invention. The wind turbine 1 comprises a tower 2, which is mounted on a non-depicted fundament. The nacelle 10 is arranged on top of the tower 2. Between the tower 2 and a main body 8 of the nacelle 10 a yaw angle adjustment device is provided, which is capable of rotating the nacelle 10 around a not depicted vertical axis, which is aligned basically with the longitudinal extension of the tower 2. By controlling the yaw angle adjustment device in an appropriate manner it can be made sure, that during a normal operation of the wind turbine 1 the nacelle 10 is always properly aligned with the current wind direction.

On a front end of the body 8 of the nacelle 10, a hub 9 having three blades (not represented in the attached drawings) is provided.

The hub 9 is rigidly coupled to a rotatable shaft 6. A schematically depicted bearing assembly 7 is provided in the nacelle 10 in order to support the rotation of the rotatable shaft 6 and of the hub 9 coupled thereto, with respect to the body 8 of the nacelle 10.

The nacelle 10 comprises an electric generator 11, located at the front end of the nacelle 10 between the hub 9 and the body 8 of the nacelle 10. In accordance with the basic principles of electrical engineering the electric generator 11 comprises a stator assembly 20 and a rotor assembly 30.

The rotor assembly 30 is rigidly coupled to the rotatable shaft 6 and rotates solidly with it around the bearing assembly 7. The stator assembly 20 is instead rigidly fixed to the body 8 of the nacelle 10. Around a circumferentially border of the stator assembly 20 an air gap 31 is provided between the stator assembly 20 and the rotor assembly 30. In operation the temperature in the air gap 31 rises. Such temperature has to be controlled beyond a limit to assure to keep the efficiency of the generator within acceptable values.

To achieve such scope, inside the body 8 of the nacelle 10 a cooling circuit 100 is provided for channeling a fluid cooling medium to the air gap 31 and channeling the same fluid cooling medium away from the air gap 31, after it has been heated in the air gap 31. In such a way the fluid cooling medium extracts heat from the air gap 31. According to a typical embodiment of the present invention, the fluid cooling medium is ambient air surrounding the nacelle 10.

The cooling circuit 100 includes a first inlet portion 110 for channeling the fluid cooling medium to the air gap 31.

The inlet portion 110 extends from an inlet opening 130 in an outer wall 134 of the body 8 of the nacelle 10. On the inlet opening 130 an air treatment unit 133 is provided for eliminating the dirt and mist content in the fluid cooling medium entering the body 8 of the nacelle 10 through the inlet opening 130. Dirt may include, for example, dust, salt, solid particles or other pollutants.

Downstream the air treatment unit 133 an inlet fan 140 is provided for making the fluid cooling medium flow (arrows F1, F2, F3 in FIG. 1) in the body 8 of the nacelle 10 towards the stator assembly 20 of the electric generator 11.

The fluid cooling medium proceeds according to an axial flow substantially parallel to the rotatable shaft 6. This flow is divided downstream into two sub-flows, one flowing directly to the air gap 31 (represented by the arrow F2 in FIG. 1) and the other (represented by the arrow F3 in FIG. 1) flowing to the air gap 31 through a plurality of inlet holes 115 provided on an inner annular support plate 21 of the stator assembly 20.

According to other embodiments of the invention (not shown in the attached Figures), any other arrangement of the flow of the fluid cooling medium may be performed inside the body 8 of the nacelle 10, provided that the fluid cooling medium is efficiently channeled to the air gap 31.

After being heated in the air gap 31, the fluid cooling medium enters the stator assembly 20 radially, i.e. according to a direction substantially orthogonal to the rotatable shaft 6.

The cooling circuit 100 includes a second outlet portion 120 for channeling the heated fluid medium away from the air gap 31. The second outlet portion 120 comprises at least two outlet holes 125 (only one is represented in the schematic view of FIG. 1) arranged on a circumferential outer hollow structure 22 attached to the annular support plate 21 of the stator assembly 20. The hollow structure 22 and the outlet holes 125 let the heated fluid medium flow from away the air gap 31, in order to extract heat from the electrical generator 11.

Downstream each of the outlet holes 125, the outlet portion 120 of the cooling circuit 100 comprises a duct 160 connecting the respective outlet hole 125 to a respective outlet opening 131, 132, for letting the heated fluid medium exit the nacelle 10.

The outlet portion 120 of the cooling circuit 100 comprises at least two outlet cooling fans 141, 142 (only one is represented in the schematic view of FIG. 1) for channeling a fluid cooling medium from the electrical generator 11 to the outside of the nacelle 10. Between the respective outlet hole 125 and the respective outlet opening 131, 132 a respective outlet cooling fan 141, 142 is provided for making the heated medium flow in the outlet portion 120 of the cooling circuit 100 towards the respective outlet opening 131, 132.

At least two outlet cooling fans 141, 142 are required for providing redundancy to the cooling circuit 100: in case of one cooling fan 141, 142 failing, the other cooling fan 142, 141 would still run. The cooling fans 141, 142 are designed in such a way that in most operational conditions (low ambient temperature), each of the cooling fans 141, 142 is able to supply the cooling capacity necessary for full power production.

Figure 2:
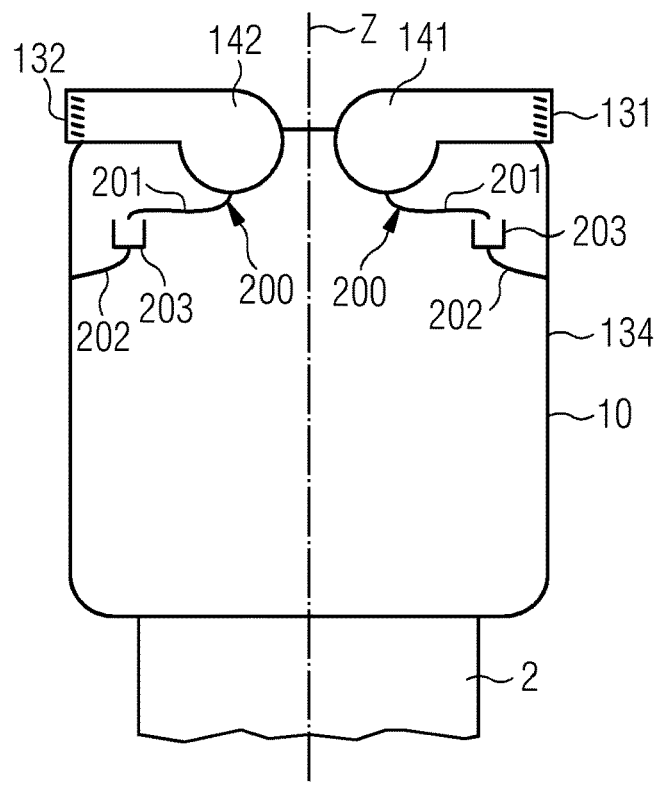
FIG. 2 shows a back view of schematic section, orthogonal to the section of FIG. 1, of the upper part of the wind turbine of FIG. 1.
Figure 3:
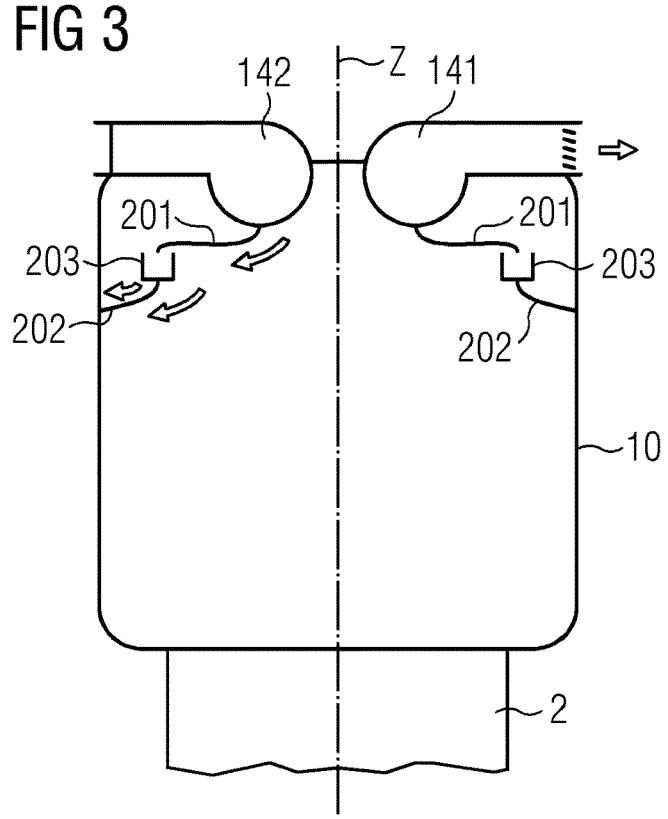
FIG. 3 shows the same back view of FIG. 2, in an operative condition.

As better shown in FIGS. 2 and 3, according to the embodiment of the attached figures two outlet fans 141, 142 are provided, symmetrically arranged with respect to a longitudinal plane Z of the nacelle 10. The longitudinal plane Z is vertically oriented when the nacelle 10 in mounted on the tower 2.

The outlet openings 131, 132 also are symmetrically arranged with respect to a longitudinal plane Z of the nacelle 10.

The inlet fan 140 and the outlet cooling fans 141, 142 are operated in order to generate respective flow rates of the fluid cooling medium, which provide a positive differential pressure in the inside and of the nacelle 10 with respect to the outside of the nacelle 10. This allows protecting the inside of the nacelle 10 from the entering of dirty air from the external environment, in particular through bearings and/or sealing provided in the nacelle 10.

The nacelle 10 further comprises a draining device 200 for channeling drainage water from the cooling fans 141, 142 to an outer wall 134 of the nacelle 10. The draining device 200 comprises, in general according to the different embodiments of the present invention, at least a first draining portion 201 connecting the cooling fans 141, 142 to an inside of the nacelle 10 and at least a second draining portion 202 for receiving drainage water from the first respective draining pipe 201 and channeling the drainage water to the outer wall 134 of the nacelle 10. According to the different embodiments of the present invention, the draining device 200 further comprises at least a water collector 203 interposed between the first draining portion 201 and the second draining portion 202.

In the embodiment of the attached FIGS. 1 to 3, the first draining portion 201 comprises for each cooling fan 141, 142 a first respective draining pipe connecting the lowest part of the housing of the respective cooling fan 141, 142 to an inside of the nacelle 10 and the second draining portion 202 comprises a second respective draining pipe for receiving drainage water from the first respective draining pipe 201 and channeling the drainage water to the outer wall 134 of the nacelle 10.

A respective water collector 203 is provided between the first respective draining pipe 201 and the second draining pipe 202. The water collector 203 receives the drainage water from the first draining pipe 201. The second draining pipe 202 connects the water collector 203 to the outer wall 134 of the nacelle 10, for letting the drainage water exiting the nacelle 10.

With particular reference to FIG. 3, the functioning draining device 200 is described in the following.

Rainwater, typically during storms and high cross wind periods, may enter the cooling fan 141, 142. To prevent the drainage water to reach the generator 11 the draining device 200 is provided. From lowest part of the housing of each of the outlet fans 141, 142, the drainage water flows in the first draining pipe 201, then it is collected in the water collector 203 and finally reaches the external environment through the second draining pipe 202.

When only one cooling fan 141, 142 is in operation (for example, as shown in FIG. 3 the cooling fan 141 at the right side is in operation and the cooling fan 142 at the left side is inactive) a relative negative pressure is generated in the hollow structure 22 of the stator assembly 20. Consequently, a relative negative pressure is generated also in the housing of the inactive cooling fan 142, 141, which is connected to the hollow structure 22 through the respective duct 160. Such relative negative pressure force air from the inside of the nacelle to reach the housing of the inactive cooling fan 142, 141 through the respective second draining pipe 202. Through the respective duct 160 connected to the inactive cooling fan 142, 141 such air flow from the inside of the nacelle 10 may reach the hollow structure 22 of the stator assembly 20. However, this does not constitute a problem because the air treatment unit 133 provided at the inlet opening 130 eliminates the dirt (for example dust, salt, solid particles) and mist content in the fluid cooling medium entering the body 8 of the nacelle 10. The air inside the nacelle 10 is therefore enough clean to not constitute a problem for the electrical generator 11, in particular in comparison with the air external to the nacelle 10.

The invention claimed is:

1. A wind turbine with a nacelle comprising:
   an electrical generator,
   a cooling circuit including at least two cooling fans for channeling a fluid cooling medium from the electrical generator to an outside of the nacelle,
   a draining device for channeling drainage water from the cooling fans to an outer wall of the nacelle,
   wherein the draining device includes at least a first draining portion connecting the cooling fans to an inside of the nacelle and at least a second draining portion for receiving drainage water from the first draining portion and channeling the drainage water to the outer wall of the nacelle,
   wherein the draining device comprises at least a water collector interposed between the first draining portion and the second draining portion.

2. The wind turbine of claim 1, wherein the first draining portion comprises for each cooling fan a first respective draining pipe connecting the respective cooling fan to an inside of the nacelle and the second draining portion comprises a second respective draining pipe for receiving drainage water from the first respective draining pipe and channeling the drainage water to the outer wall of the nacelle.

3. The wind turbine of claim 2, wherein a respective water collector is provided between the first respective draining pipe and the second respective draining pipe.

4. The wind turbine of claim 1, wherein the cooling circuit comprises at least an inlet fan for channeling the fluid cooling medium from an outside of the nacelle to an inside of the nacelle.

5. The wind turbine of claim 4, wherein the inlet fan and the cooling fans are operated in order to provide a positive differential pressure in the inside of the nacelle with respect to the outside of the nacelle.

6. The wind turbine of claim 1, wherein the cooling circuit includes a first inlet portion for channeling the fluid cooling medium to the electrical generator.

7. The wind turbine of claim 6, wherein first inlet portion comprises an air treatment unit for cleaning the fluid cooling medium entering the nacelle.

8. The wind turbine of claim 6, wherein the cooling circuit includes a second outlet portion for letting the fluid medium from the electrical generator exit the nacelle, the second outlet portion comprising a duct connecting a respective outlet hole in a stator assembly of the electrical generator to a respective outlet opening, the respective cooling fan being provided between the respective outlet hole and the respective outlet opening.

\* \* \* \* \*